United States Patent
Sato

(10) Patent No.: US 7,930,133 B2
(45) Date of Patent: Apr. 19, 2011

(54) MAGNETIC-SENSOR CONTROLLER, MAGNETISM MEASUREMENT APPARATUS, OFFSET SETTING METHOD, AND COMPUTER-READABLE MEDIUM ON WHICH OFFSET SETTING PROGRAM IS RECORDED

(75) Inventor: Hideki Sato, Hamamatsu (JP)

(73) Assignee: Yamaha Corporation, Shizuoka-ken (JP)

(*) Notice: Subject to any disclaimer, the term of this patent is extended or adjusted under 35 U.S.C. 154(b) by 594 days.

(21) Appl. No.: 11/677,456

(22) Filed: Feb. 21, 2007

(65) Prior Publication Data

US 2007/0198209 A1 Aug. 23, 2007

(30) Foreign Application Priority Data

Feb. 21, 2006 (JP) ................................ 2006-044359

(51) Int. Cl.
*G01B 15/00* (2006.01)
*G06F 19/00* (2006.01)

(52) U.S. Cl. ........ 702/152; 702/127; 702/150; 702/153; 702/155; 702/157; 324/244; 324/247; 324/249; 324/251; 324/253

(58) Field of Classification Search .................. 702/127, 702/150, 152, 153, 155, 157; 324/244, 247, 324/249, 251, 252, 253
See application file for complete search history.

(56) References Cited

U.S. PATENT DOCUMENTS

| 4,660,161 A | 4/1987 | Okada |
| 5,297,063 A | 3/1994 | Cage |

FOREIGN PATENT DOCUMENTS

| EP | 1 519 148 A1 | 3/2005 |
| EP | 1 519 148 A1 * | 3/2005 |
| JP | 60-58758 | 3/1994 |
| JP | 2005207799 A | 8/2005 |
| WO | WO-2004/003476 A1 | 1/2004 |

* cited by examiner

*Primary Examiner* — Sujoy K Kundu
(74) *Attorney, Agent, or Firm* — Dickstein Shapiro LLP

(57) ABSTRACT

A magnetic-sensor controller includes an input section, a perpendicular-bisector calculation section, a storage section, and a setting section. The input section successively inputs a plurality of magnetic data sets successively output from a three-dimensional magnetic sensor. Each magnetic data includes three components. The perpendicular-bisector calculation section calculates, for each pair of two of the magnetic data sets, a perpendicular bisector of two points corresponding to the two magnetic data sets. The storage section stores a plurality of perpendicular bisectors. The setting section statistically approximates, by a single point, a region where the plurality of perpendicular bisectors stored in the storage section meet, and sets an offset of the magnetic data set on the basis of the single point. The magnetic-sensor controller enables accurate setting of an offset even when the magnetic field strength changes.

9 Claims, 9 Drawing Sheets

+: TRUE OFFSET

+: TRUE OFFSET

MAGNETIC-SENSOR CONTROLLER, MAGNETISM MEASUREMENT APPARATUS, OFFSET SETTING METHOD, AND COMPUTER-READABLE MEDIUM ON WHICH OFFSET SETTING PROGRAM IS RECORDED

BACKGROUND OF THE INVENTION

1. Field of the Invention

The present invention relates to a magnetic-sensor controller, a magnetism measurement apparatus, an offset setting method, and a computer-readable medium on which an offset setting program is recorded.

2. Description of the Related Art

A conventionally known three-dimensional magnetic sensor mounted on a movable body and adapted to detect the direction of geomagnetism typically includes a magnetic sensor module which detects a magnetic field vector as components in three directions intersecting orthogonally to one another. The direction and size of a vector whose components are represented by magnetic data, which are the output of the three-dimensional magnetic sensor, are the direction of and strength of a magnetic field detected by the three-dimensional magnetic sensor. When the direction or strength of the geomagnetism is determined on the basis of the output of the three-dimensional magnetic sensor, the output includes a component attributable to magnetism of the movable body and a measurement error of the magnetic sensor itself. Accordingly, processing must be performed for correcting the output of the three-dimensional magnetic sensor to cancel out the component and the error. The value for the correction processing is called "offset." This offset represents a magnetic field vector associated with the magnetism of the movable body which the three-dimensional magnetic sensor detects while involving the measurement error of the magnetic sensor. The component attributable to the magnetism of the movable body and the measurement error of the magnetic sensor are canceled out altogether by subtracting the offset from the magnetic data, which are the output of the three-dimensional magnetic sensor. In a three-dimensional coordinate space, a point represented by the magnetic data is plotted along a predetermined spherical surface. The offset can be calculated by obtaining the center of the spherical surface. The processing for obtaining the offset is called calibration.

Incidentally, even when magnetic data necessary for calculation of the offset are measured, a set of points represented by the magnetic data does not form a complete spherical surface, because of, for example, the measurement error of the three-dimensional magnetic sensor itself, a variation in the magnetic field during the measurement period, or a calculation error produced when the output of the three-dimensional magnetic sensor is converted to digital values. International Application Laid-Open No. WO2004-003476 discloses a technique for statistically estimating a point which minimizes the variation in distance between that point and a plurality of points represented by a plurality of sets of obtained magnetic data. The three-dimensional magnetic sensor enables calibration to be performed without forcing a user to intentionally rotate the movable body on a plane. Therefore, it is not necessary to provide a guide to the user on how to move the movable body during the calibration. Therefore, it is very likely that the strength of the magnetic field acting on the movable body varies during the calibration. For example, when the measurement errors, etc. are assumed to be neglected, each of points represented by magnetic data measured while the user has been walking are theoretically located on each of spherical surface whose radius corresponds to the strength of the magnetic field at the time when the respective magnetic data were measured. Thus, the points are not located on a common spherical surface having a fixed radius. Therefore, the method disclosed in the publication has a problem in that the position estimated as the center of the sphere involves a large error.

SUMMARY OF THE INVENTION

In view of the foregoing, one of objects of the present invention is to provide a magnetic-sensor controller, a magnetism measurement apparatus, an offset setting method, and a computer-readable medium on which an offset setting program is recorded, which enable accurate setting (determination) of an offset even when the magnetic field strength varies.

In order to achieve the above-described object, the present invention provides a magnetic-sensor controller comprising input section which successively inputs a plurality of magnetic data sets successively output from a three-dimensional magnetic sensor, each of data sets including three components; perpendicular-bisector calculation section which calculates, for each pair of two of the magnetic data sets, a perpendicular bisector plane (hereinafter simply referred to as "perpendicular bisector") of two points corresponding to the two magnetic data sets; memory which stores a plurality of the perpendicular bisectors; and setting section which statistically approximates, by a single point, a region where the plurality of perpendicular bisectors stored in the memory meet and sets an offset of the magnetic data sets on the basis of the single point.

A perpendicular bisector of two points which are present on a single spherical surface passes through the center of the sphere. When magnetic data are input at locations which differ in magnetic field strength, each of the points corresponding to these magnetic data is theoretically present on each of spherical surfaces of spheres, each having a radius corresponding to the magnetic field strength on the assumption that the measurement error is excluded. According to the configuration in which each of perpendicular bisectors is calculated for each pair of two input magnetic data sets, if the magnetic data sets in each pair for calculating each perpendicular bisector are input under substantially the same magnetic field strength, each of the calculated perpendicular bisectors passes near a center of concentric spheres each of which has a radius corresponding to magnetic field strength when the magnetic data sets in each pair are input. Therefore, by means of statistically approximating, by a single point, a region where such perpendicular bisectors meet and setting an offset on the basis of the single point, the error of (in) the offset in relation to the true offset can be reduced.

Preferably, the setting section calculates the single point by a least-squares method using the plurality of perpendicular bisectors stored in the memory.

Preferably, the magnetic-sensor controller further comprises selector which selects suitable pairs each of which is obtained by combining, in the order of input, two magnetic data sets if the two magnetic data sets corresponds to respective two points spaced from each other by at least a predetermined distance, wherein the perpendicular bisector calculation section calculates the perpendicular bisectors from the selected pairs.

By means of selecting pairs each of which has two magnetic data sets corresponding to respective two points spaced from each other by at least the predetermined distance and calculating the perpendicular bisectors based on the selected pairs, it becomes possible to reduce the error in each of the calculated perpendicular bisectors in relation to the true offset, the error being produced due to influences of, for example, measurement error of the three-dimensional magnetic sensor itself, or calculation error at the time of obtaining the output of the three-dimensional magnetic sensor as digital values. By means of obtaining pairs by combining two magnetic data sets in the order of input, selecting an appropriate pair out of the thus obtained pairs, and calculating the perpendicular bisector based on the thus selected pair, it is possible to reduce the time difference between input timings of the two magnetic data sets forming the pair for calculating the perpendicular bisector. Therefore, an influence of variation in magnetic field strength is reduced, compared to a case where a perpendicular bisector is calculated based on two points represented by two magnetic data sets whose input orders are not close to each other. Accordingly, the error of the calculated perpendicular bisector in relation to the true offset can be reduced.

The magnetic-sensor controller may comprise management section which manages the memory so as to store a newly calculated perpendicular bisector into the memory when all the angles between the newly calculated perpendicular bisector and one of the perpendicular bisectors already stored in the memory are greater than or equal to a predetermined angle.

According to the configuration above, only when all the angles between the newly calculated perpendicular bisector and one of the stored perpendicular bisectors are greater than or equal to a predetermined angle, the newly calculated perpendicular bisector is selected as an element of a population for statistical calculation. Thus, the error of the statistically obtained offset can be reduced, because of the following reason described by an example in which two perpendicular bisectors are considered. Even when the distance between each of the two perpendicular bisectors and the point corresponding to the true offset is small, the distance between the common line of the two perpendicular bisectors and the point corresponding to the true offset becomes large, if the two perpendicular bisectors are nearly parallel to each other. Therefore, if such perpendicular bisectors are contained in the population for statistical calculation, the error of the offset increases. It should be noted that the expression "all the angles between two planes" refers to all of four angles formed between the two planes.

Alternatively, the magnetic-sensor controller may comprise management section which manages the memory so as to store a newly calculated perpendicular bisector into the memory when all the angles between the newly calculated perpendicular bisector and all (i.e., every and any one of) the perpendicular bisectors already stored in the memory are greater than or equal to a predetermined angle.

According to the configuration above, only when all the angles between the newly calculated perpendicular bisector and all the stored perpendicular bisectors are greater than or equal to a predetermined angle, the newly calculated perpendicular bisector is selected as an element of a population for statistical calculation. Thus, the error of the statistically obtained offset can be reduced, because of the following reason described by an example in which two perpendicular bisectors are considered. Even when the distance between each of the two perpendicular bisectors and the point corresponding to the true offset is small, the distance between the common line of the two perpendicular bisectors and the point corresponding to the true offset becomes large, if the two perpendicular bisectors are nearly parallel to each other. Therefore, if such perpendicular bisectors are contained in the population for statistical calculation, the error of the offset increases.

Alternatively, the magnetic-sensor controller may comprise management section which manages the memory so as to store in the memory the perpendicular bisectors in a predetermined number or less (or up to a predetermined number) for each of area sections which is defined on the spherical surface of a unit sphere centered at a specific point and which is substantially equal in area to each other, wherein the end point of a unit vector which is perpendicular to each perpendicular bisector stored in the memory and whose start point coincides with the specific point is contained in the corresponding area section.

In the configuration in which a predetermined number or less of perpendicular bisectors are stored for each of area sections which is defined on the spherical surface of a unit sphere centered at a specific point and which is substantially equal in area to each other, wherein the end point of a unit vector which is perpendicular to each of the perpendicular bisector stored in the memory and whose start point coincides with the specific point is contained in the corresponding area section, a population for statistical processing is not formed by a plurality of perpendicular bisectors including perpendicular bisectors whose directions are biased to a specific direction. Therefore, the error of the offset statistically obtained by use of such a population can be reduced.

In other words, the magnetic-sensor controller may comprise management section which manages the memory so as to store a newly calculated perpendicular bisector into the memory when an end point of a unit vector which is perpendicular to the newly calculated perpendicular bisector and whose start point coincides with a specific point is contained in one of area sections and the number of perpendicular bisectors which have been stored into the memory as the perpendicular bisectors each of which has a unit vector which is perpendicular to each of the corresponding stored perpendicular bisectors, whose end point is contained in the one of area sections, and whose start point coincides with the specific point, is less than a predetermined number, each of the area sections being defined on the spherical surface of a unit sphere centered at the specific point and being substantially equal in area to each other.

The respective functions of the plurality of sections of the present invention are realized by hardware resources whose functions are determined by their structures themselves, hardware resources whose functions are determined by programs, or a combination of these resources. Further, the respective functions of the plurality of sections of the present invention are not limited to those realized by hardware resources which are physically independent of one another.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Each of embodiments of the present invention will be described with reference to the drawings.

In the present embodiments, an offset is obtained. The offset is for canceling out a magnetic component attributable to the magnetism of a movable body on which the three-dimensional magnetic sensor is mounted and a measurement error produced by the three-dimensional magnetic sensor itself, both of which are contained in the output of a three-dimensional magnetic sensor. For obtaining the offset, it is necessary for a set containing an infinite number of points in a vector space represented by magnetic data, which are the output of the three-dimensional magnetic sensor, to be approximated as a spherical surface. This spherical surface will be referred to as the spherical surface of an azimuth sphere. A set containing an infinite number of points in a vector space represented by magnetic data, which are the ideal output of the three-dimensional magnetic sensor that contains no measurement error, etc., will be referred to as a spherical surface of a true azimuth sphere. The radius of the true azimuth sphere corresponds to the magnetic field strength of geomagnetism. In each of the present embodiments, the coordinates of the center of the azimuth sphere are calculated as the offset.

1. Hardware Configuration

Figure 2:
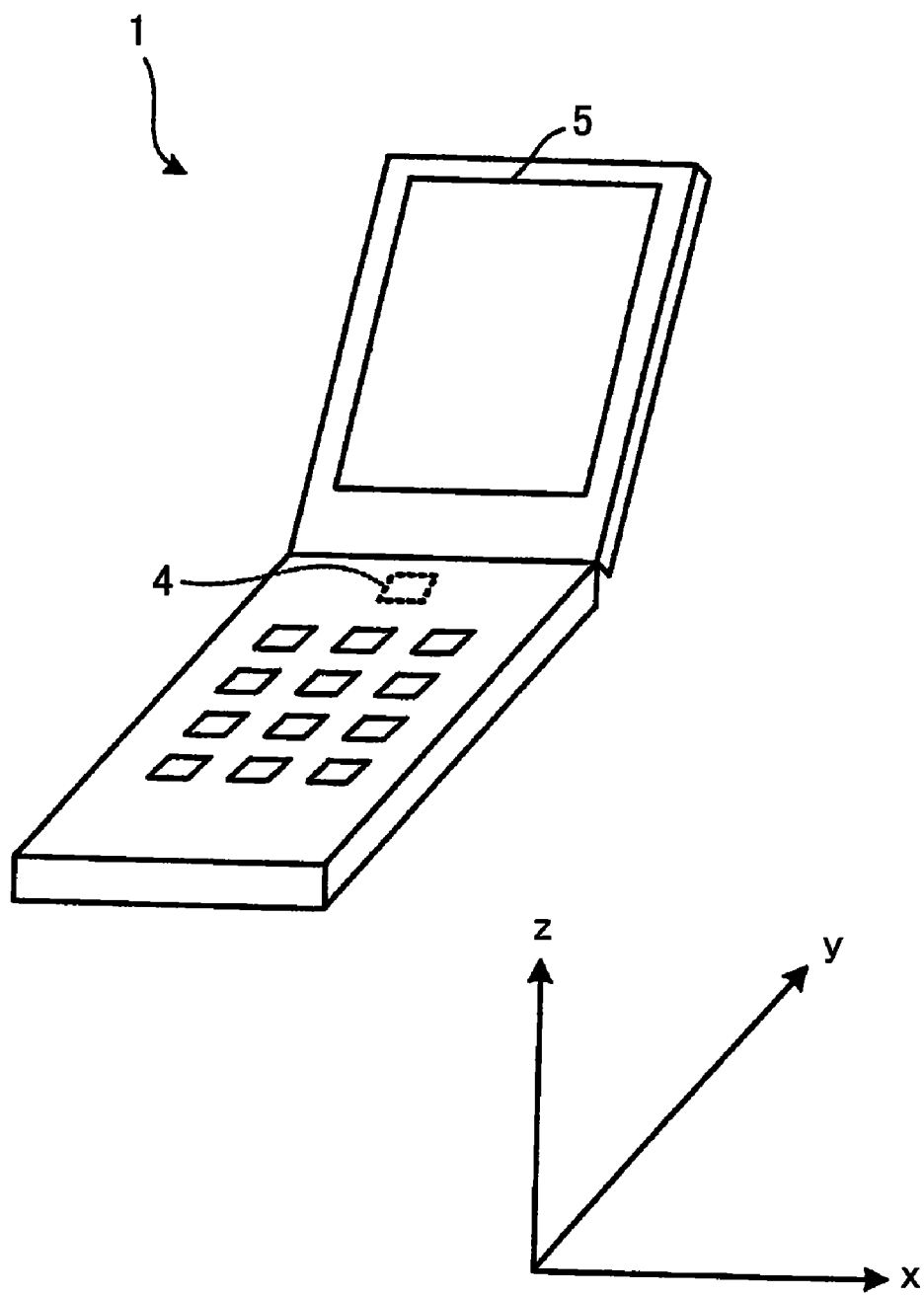
FIG. 2 is a schematic view of the embodiment of the present invention.
Figure 3:
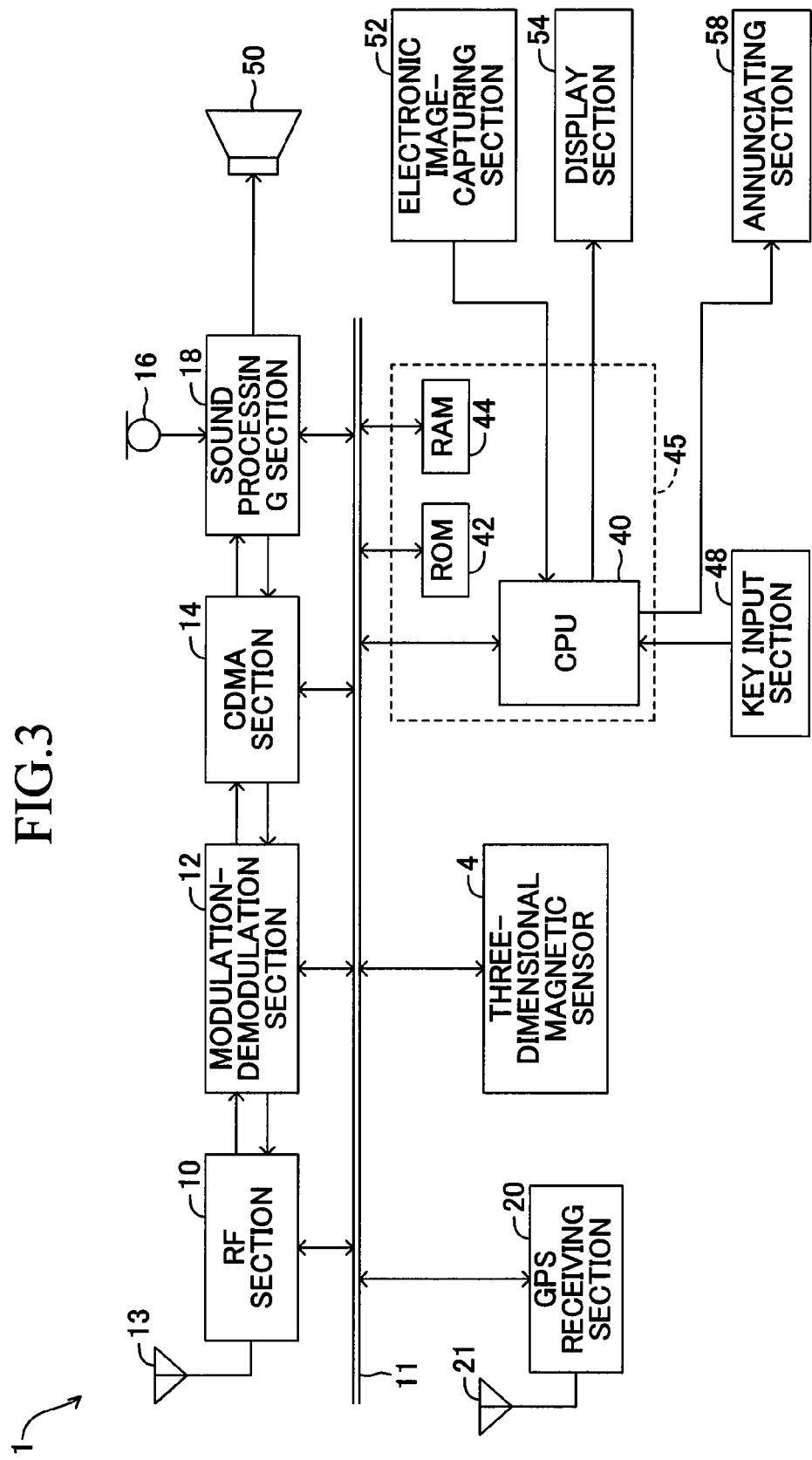
FIG. 3 is a hardware block diagram of the embodiment of the present invention.

FIG. 2 is a schematic view showing the appearance of a cellular phone 1, which is one example of a movable body to which the present invention is applied. FIG. 3 is a block diagram of the cellular phone 1. A three-dimensional magnetic sensor 4 is mounted on the cellular phone 1. The three-dimensional magnetic sensor 4 detects the direction and strength of a magnetic field through detection of vector components of the magnetic field in three directions (x, y, z) intersecting orthogonally to one another. A display 5 displays various types of information such as characters and images. For example, the display 5 displays a map, and arrows or characters for showing the azimuth.

A control section 45 is a so-called computer including a CPU 40, ROM 42, and RAM 44, and constitutes a magnetic sensor controller. The CPU 40 is a processor for performing overall control of the cellular phone 1. The ROM 42 is a nonvolatile storage medium which stores a magnetic sensor control program and various programs, such as a navigation program, which realize the functions of the movable body. These programs are executed by the CPU 40. The magnetic sensor control program provides azimuth data to the navigation program or the like on the basis of the magnetic data output from the three-dimensional magnetic sensor 4. The azimuth data are two-dimensional vector data representing the direction of the geomagnetism. It should be noted that the azimuth data may be provided to the navigation program in the form of three-dimensional vector data. An offset setting program is included in a group of modules of the magnetic sensor control program. The offset setting program sets (or determines) the offset used to correct the magnetic data output from the three-dimensional magnetic sensor 4. When the CPU 40 executes the magnetic sensor control program, the CPU 40, the RAM 44, and the ROM 42 function as a magnetic sensor controller. The navigation program is a well-known program for displaying a map of the area surrounding a route from the present position to a destination. In order to facilitate viewing of a map, the map including the present position is displayed on a screen such that the actual azimuth coincides with the azimuth on the map. Therefore, when the cellular phone 1 is turned, the map displayed on the display 5 rotates in relation to the display 5 such that the map does not rotate in relation to the ground. The azimuth data are used in such map display processing. Needless to say, the azimuth data may be used only for displaying the azimuth by use of characters or arrows. The RAM 44 is a volatile storage medium for temporarily holding data to be proceed by the CPU 40. The control section 45 may be configured such that a portion or the entirety of the various programs is stored in the ROM 42 through communications via a network. Notably, the magnetic sensor controller and the three-dimensional magnetic sensor 4 may be integrated into a single-chip to constitute the magnetism measurement apparatus.

An antenna 13, an RF section 10, a modulation-demodulation section 12, and a CDMA section 14 form a circuit for performing communications in the CDMA scheme between a base station and the cellular phone 1.

A sound-processing section 18 is a circuit for performing AD conversion of an analog voice signal input from a microphone 16 and DA conversion for outputting an analog voice signal to a speaker 50.

A GPS receiving section 20 is a circuit for processing GPS radio waves from GPS satellites received by an antenna 21 and outputting the longitude and latitude of the present position.

A key input section 48 includes cursor keys, dial keys, and the like, which also serve as character input keys.

An electronic image-capturing section 52 is composed of an optical system, an imaging element, an AD converter, etc., which are not shown.

A display section 54 is composed of the display 5, such as an LCD, and an unillustrated display control circuit, and so forth. The display section 54 displays various screens in accordance with the operation mode of the cellular phone 1.

An annunciating section 58 includes a sound-source circuit, an incoming-sound speaker, a vibrator, a LED, etc., which are not shown, and annunciates an incoming call to the user.

Figure 4:
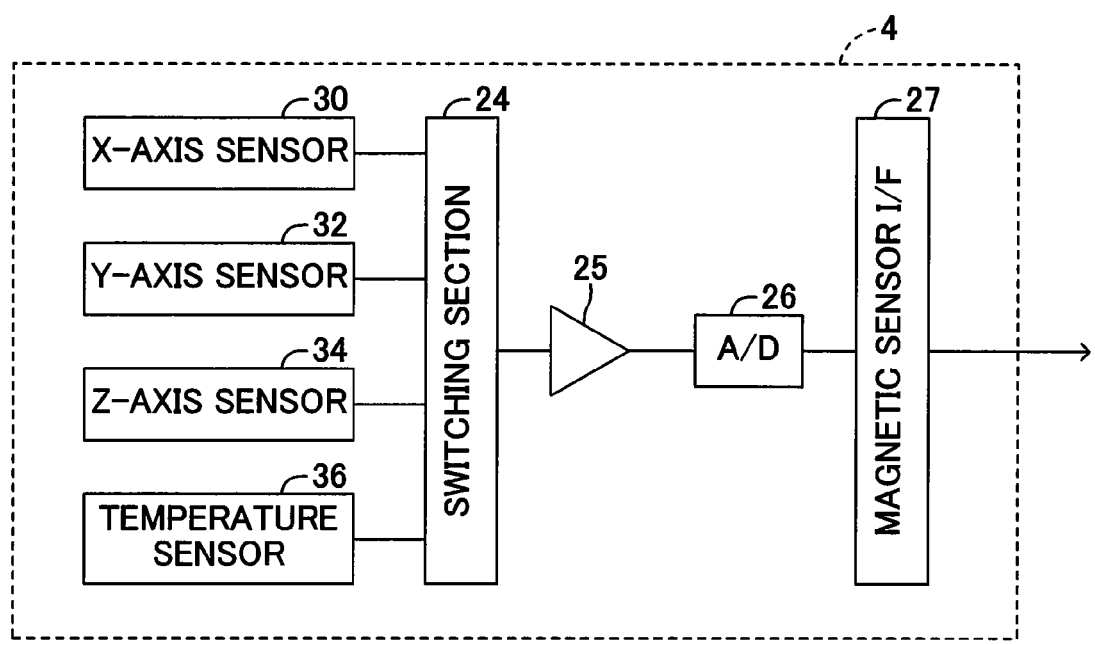
FIG. 4 is a schematic diagram showing the internal structure of a three-dimensional magnetic sensor according to the embodiment of the present invention.

FIG. 4 is a diagram schematically showing the internal structure of the three-dimensional magnetic sensor 4. The three-dimensional magnetic sensor 4 includes an x-axis sensor 30, a y-axis sensor 32, and a z-axis sensor 34 that detect x-axis, y-axis, and z-axis components, respectively, of a magnetic field vector associated with geomagnetism. Each of the x-axis sensor 30, the y-axis sensor 32, and the z-axis sensor 34 is composed of a giant magneto-resistive element, a Hall element, or the like. However, any type of single-dimensional magnetic sensor having directivity may be used for each of the sensors. The x-axis sensor 30, the y-axis sensor 32, and the z-axis sensor 34 are fixed to the cellular phone 1 such that their sensitive directions perpendicularly intersect one another (or are orthogonal to one another). Outputs of the x-axis sensor 30, the y-axis sensor 32, the z-axis sensor 34, and a temperature sensor 36 are selected by a switching section 24. The selected output is amplified by an amplifier 25, and then converted into digital data by an A/D converter 26. Each of x-Axis magnetic data, y-axis magnetic data, z-axis magnetic data, and temperature data, which correspond to the outputs of the x-axis sensor 30, the y-axis sensor 32, the z-axis sensor 34, and the temperature sensor 36, respectively, is output to a bus 11 via a magnetic sensor I/F (interface) 27. The temperature data may be used for setting of the offset and/or for the temperature correction of the x-axis magnetic data, the y-axis magnetic data, and the z-axis magnetic data. Output data of the three-dimensional magnetic sensor 4, which are composed of three components; i.e., the x-axis magnetic data, the y-axis magnetic data, and the z-axis magnetic data, will be referred to as "magnetic data."

2. First Offset Setting Method

Figure 1:
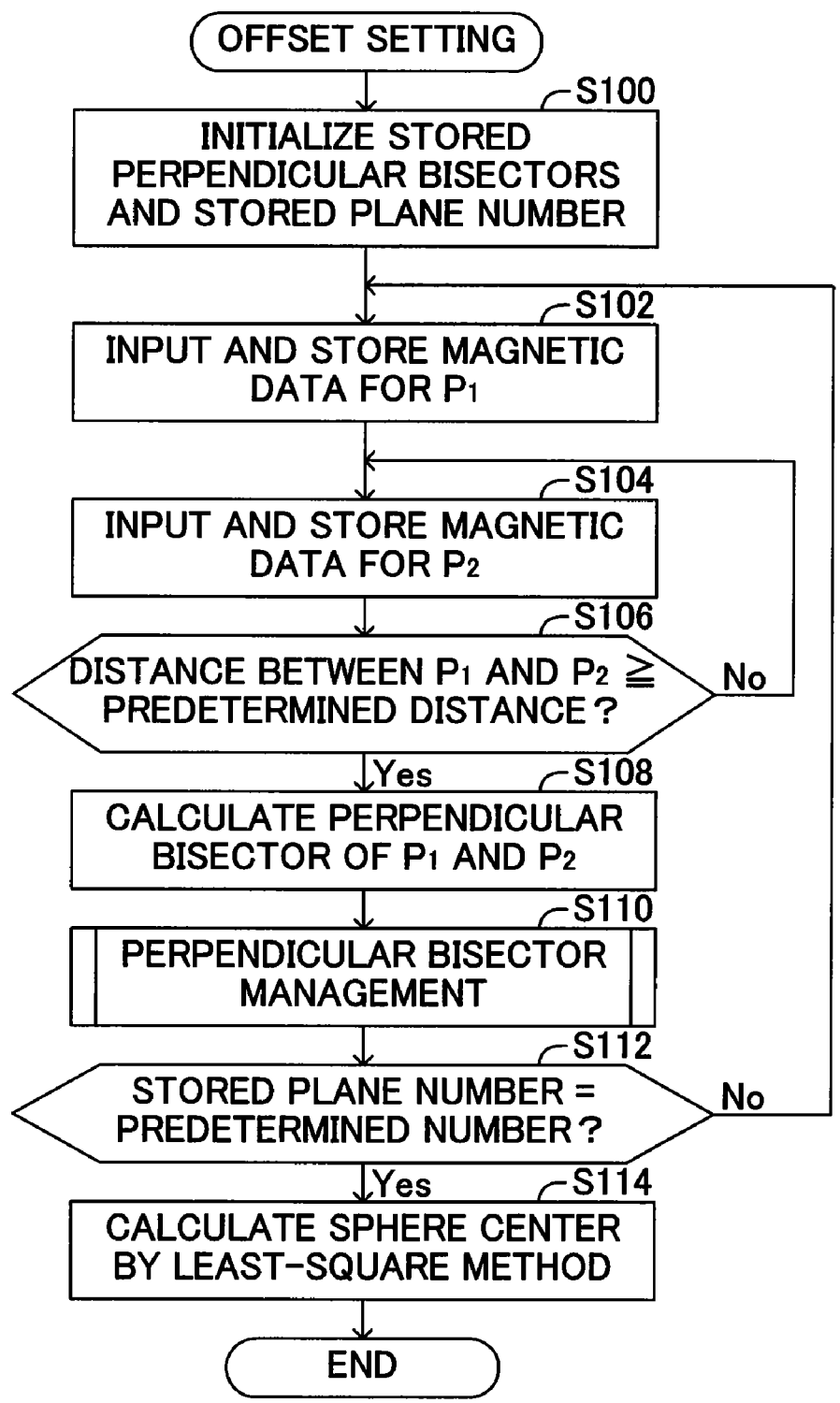
FIG. 1 is a flowchart according to one embodiment of the present invention.

FIG. 1 is a flowchart showing the flow of offset setting processing. The processing shown in FIG. 1 is executed by the CPU 40 when an offset update request is generated. This offset update request is generated, for example, at the time of an incoming call, every time a certain period of time elapses, or upon startup of a navigation program by the user.

First, a group of perpendicular bisectors and the stored plane number, which are stored in the RAM 44, are initialized (step S100). Specifically, one perpendicular bisector, which is represented by an equation ax+by+cz+d=0, is stored in the RAM 44 in such a manner that the values of the respective coefficients a, b, c, d are stored in corresponding variable areas. The RAM 44 includes variable areas in which the values of the respective coefficients are stored so as to memorize a predetermined number of perpendicular bisectors. The stored plane number is a parameter representing the number of perpendicular bisectors stored in the RAM 44 in this manner. In step S100, the values of the respective variable areas of the perpendicular bisectors stored in the RAM 44 are discarded, and the stored plane number is initialized to 0.

In step S102, magnetic data are input to the control section 45, and the input magnetic data are stored as magnetic data representing a point $p_1$ in the vector space. In the RAM 44, the magnetic data for point $p_1$ are stored in a data structure corresponding to the point $p_1$ in the form of coordinates having three components; i.e., x, y, and z components.

In step S104, magnetic data are input to the control section 45, and the input magnetic data are stored as magnetic data representing a point $p_2$ in the vector space. In the RAM 44, the magnetic data for point $p_2$ are stored in a data structure corresponding to the point $p_2$ in the form of coordinates having three components; i.e., x, y, and z components.

In step S106, a determination is made as to whether the distance between $p_1$ and $p_2$ is not less than (i.e. equal to or larger than) a predetermined distance. When the distance between $p_1$ and $p_2$ is less than the predetermined distance, the CPU 40 returns to step S104 so as to input another magnetic data (for $p_2$). The reason why, when the distance between $p_1$ and $p_2$ is less than the predetermined distance, the CPU 40 obtains only magnetic data for the second point in step S104, rather than obtains two new sets of magnetic data by returning to step S102 and S104, is to avoid the case where a pair of magnetic data sets cannot be selected easily because the distance between two points represented by two magnetic data sets successively input from the three-dimensional magnetic sensor 4 hardly exceeds the predetermined distance. Such a case occurs when the orientation of the body of the cellular phone 1 changes slowly.

Figure 5A:
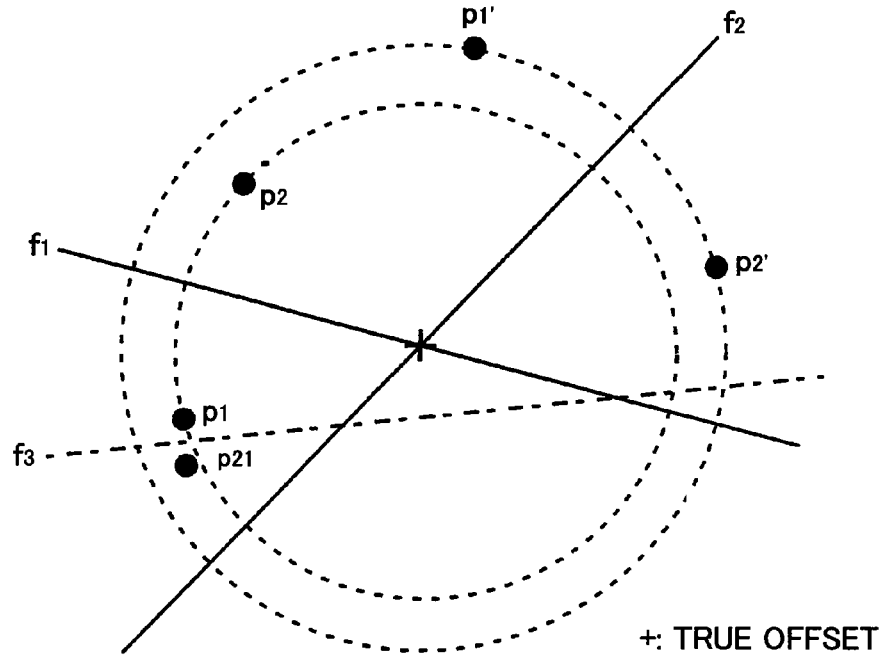
FIGS. 5A and 5B are schematic diagrams relating to the embodiment of the present invention.
Figure 5B:
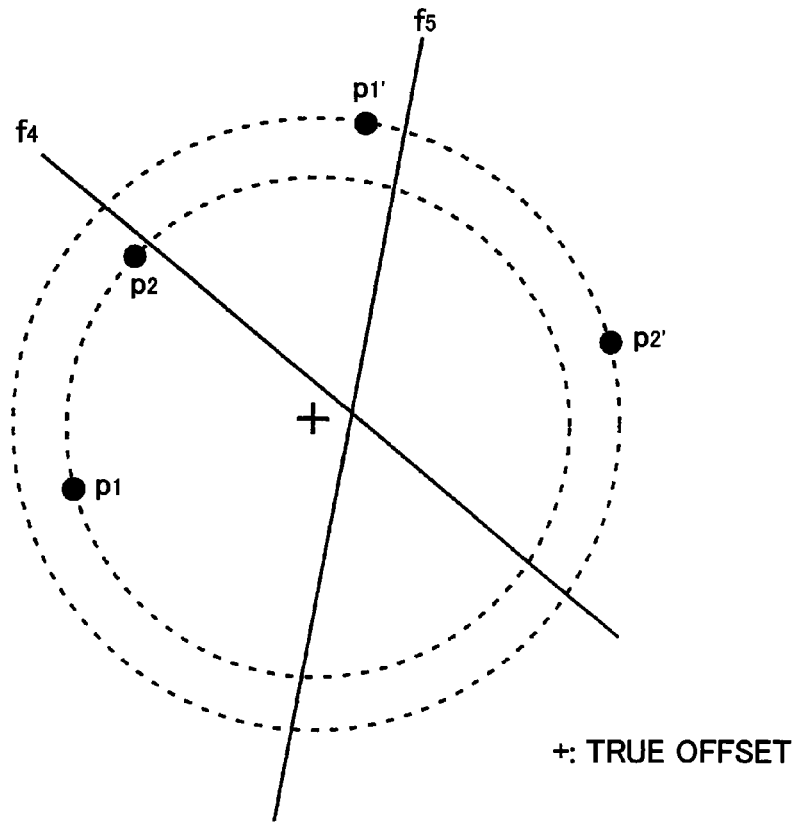

FIGS. 5A and 5B each show points corresponding to the input magnetic data sets, and their perpendicular bisectors. For simplifying the description, FIGS. 5A and 5B each show a two-dimensional view. In FIGS. 5A and 5B, the magnetic data sets for points $p_1$, $p_2$, $p_1'$, $p_2'$ are assumed to be input in this sequence. In FIG. 5A, $f_1$ represents the perpendicular bisector between $p_1$ and $p_2$, and $f_2$ represents the perpendicular bisector between $p_1'$ and $p_2'$. When the two points for calculating the corresponding perpendicular bisector are obtained under substantially the same magnetic field strength, the perpendicular bisector (in this example, each of the perpendicular bisectors $f_1$ and $f_2$) passes near the true offset.

When the distance between $p_1$ and $p_2$ is excessively small, it is likely that the points $p_1$ and $p_2$ (=$p_{21}$) separate slightly from the spherical surface of an azimuth sphere centered at the point corresponding to the true offset only due to influences of, for example, measurement error of the three-dimensional magnetic sensor 4 itself, or calculation error at the time of acquiring the output of the three-dimensional magnetic sensor 4 as digital values. Therefore, the distance between the perpendicular bisector of $p_1$ and $p_2$ (in this example, $p_2$=$p_{21}$) and a point corresponding to the true offset may become very large (see a perpendicular bisector $f_3$ represented by a dashed-dotted line in FIG. 5A). Accordingly, if the offset is calculated by use of that perpendicular bisector (e.g., f3), the error in the calculated offset with respect to the true offset may become very large. In the processing of step S106, the input magnetic data sets are screened so as to prevent use of a perpendicular bisector between two excessively close points for setting of the offset. Further, by the processing of step S106, since the magnetic data sets used for calculation of a perpendicular bisector are combined in the order of input, it becomes possible to reduce the difference between magnetic field strengths corresponding to a pair of magnetic data sets from which a single perpendicular bisector is determined. Accordingly, the offset can be accurately set by calculating the offset by use of a perpendicular bisector obtained in such a manner. In contrast, in a case where a perpendicular bisector is calculated between two points which are excessively apart from each other in the input order as shown in FIG. 5B (in other words, a perpendicular bisector is calculated based on one magnetic data set obtained at a certain timing and another magnetic data obtained at a different timing which is far apart in time from the certain timing), the perpendicular bisector may be calculated such that the distance between the calculated perpendicular bisector and the point corresponding to the true offset is excessively large due to variation in magnetic field strength. This is shown in FIG. 5B, where $f_4$ represents a perpendicular bisector between $p_1$ and $p_1'$, and $f_5$ represents a perpendicular bisector between $p_2$ and $p_2'$.

In step S108, a perpendicular bisector is calculated from the coordinates of the two obtained points. When the coordinates of $p_1$ and $p_2$ are represented by $x_1, y_1, z_1$ and $x_2, y_2, z_2$, respectively, the perpendicular bisector of $p_1$ and $p_2$ is represented by the following Equation (1).

$$(x_2 - x_1)\left(X - \frac{x_1 + x_2}{2}\right) + \\ (y_2 - y_1)\left(Y - \frac{y_1 + y_2}{2}\right) + (z_2 - z_1)\left(\frac{Z - z_1 + z_2}{2}\right) = 0 \qquad (1)$$

When the above equation is converted to the form of ax+by+cz+d=0, a, b, c, and d are represented by the following Equation (2).

$a = 2(x_2 - x_1)$ $b = 2(y_2 - y_1)$ $c = 2(z_2 - z_1)$ $d = -(x_2-x_1)(x_2+x_1)-(y_2-y_1)(y_2+y_1)-(z_2-z_1)(z_2+z_1)$ \qquad (2)

In step S110, perpendicular bisector management processing is performed.

Figure 6:
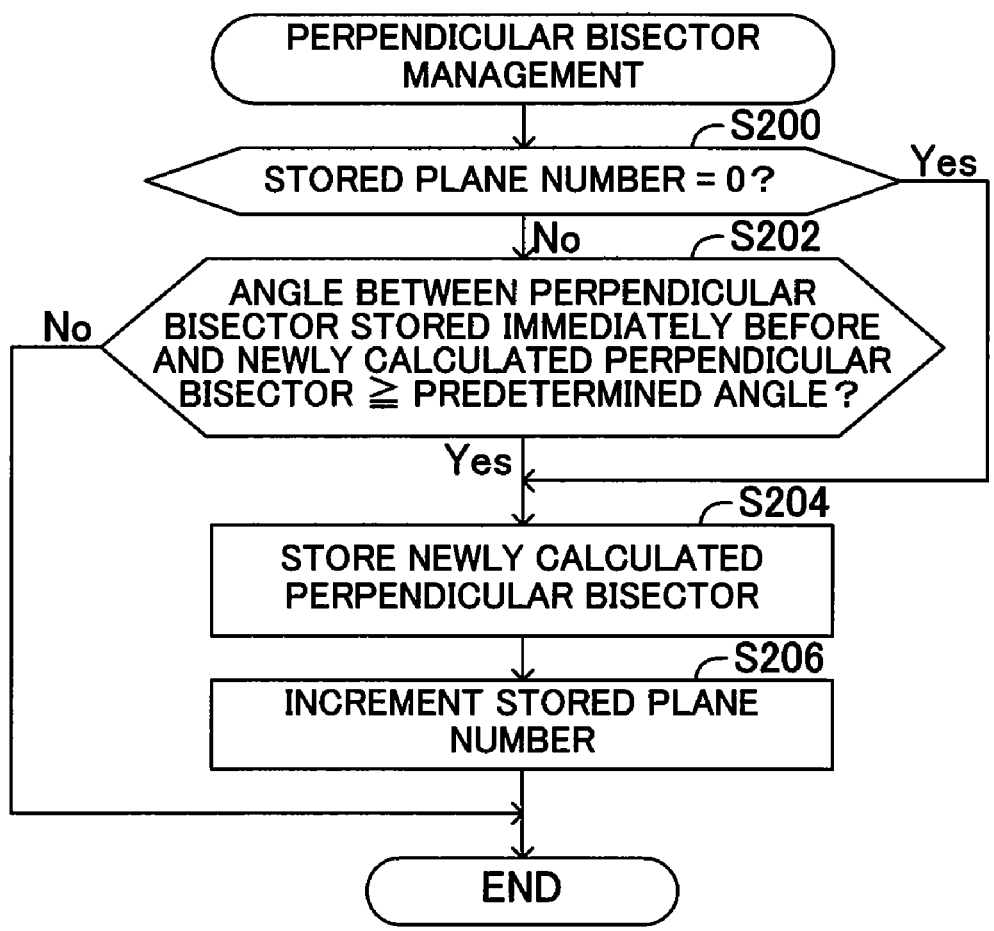
FIG. 6 is a flowchart according to the embodiment of the present invention.

FIG. 6 is a flowchart showing the flow of the perpendicular bisector management processing.

In step S200, the CPU 40 determines whether or not the stored plane number is zero. When no perpendicular bisector is stored in the RAM 44, the CPU 40 proceeds to the processing of step S204.

In step S202, the CPU 40 determines whether or not the angle between the perpendicular bisector newly calculated and the perpendicular bisector calculated immediately before the calculation of the newly calculated perpendicular bisector is at least (i.e., is equal to or larger than) a predetermined angle. Obtaining the angle between the two planes is equivalent to obtaining an angle between the respective perpendicular vectors of these planes. Accordingly, the perpendicular bisector $a_1x+b_1y+c_1z+d_1=0$ which is newly calculated this time, the perpendicular bisector $a_2x+b_2y+c_2z+d_2=0$ which is calculated previously (i.e., immediately before the calculation of the newly calculated perpendicular bisector), and the angle θ formed therebetween have a relation as expressed by the following Equation (3).

$$\cos\theta = \frac{a_1a_2 + b_1b_2 + c_1c_2}{\sqrt{a_1^2 + b_1^2 + c_1^2}\sqrt{a_2^2 + b_2^2 + c_2^2}} \quad (3)$$

Accordingly, in order to determine whether the angle θ between the two planes is greater than a predetermined value α (α<π/2), determination as to whether the relation of the following Equation (4) is satisfied is performed through calculation.

$$\cos\alpha > \left|\frac{a_1a_2 + b_1b_2 + c_1c_2}{\sqrt{a_1^2 + b_1^2 + c_1^2}\sqrt{a_2^2 + b_2^2 + c_2^2}}\right| \quad (4)$$

Only when all the angles between the perpendicular bisector newly calculated and the perpendicular bisector calculated and stored immediately before the calculation of the newly calculated perpendicular bisector are equal to or greater than a predetermined angle, the newly calculated perpendicular bisector is selected as an element of a population for statistical calculation. Thus, the error of (in) the offset obtained by use of a statistical method can be reduced, because of the following reason explained by taking an example in which two perpendicular bisectors are considered. Even when the distance between each of the perpendicular bisectors and the point corresponding to the true offset is small, the distance between the common line of the two perpendicular bisectors and the point corresponding to the true offset becomes large, if the two perpendicular bisectors are nearly parallel to each other. Therefore, if such perpendicular bisectors are contained in the population for statistical calculation, the error of the offset becomes large.

Notably, a perpendicular bisector which is used as a reference plane for the determination of the angle regarding the newly calculated perpendicular bisector in step S202 (a perpendicular bisector which is used to form the angle with respect to the newly calculated perpendicular bisector for the determination using the Equation (4) in step S202) may be the perpendicular bisector stored immediately before as described above, one (specified one) of the already stored perpendicular bisectors other than the perpendicular bisector stored immediately before, or all the perpendicular bisectors stored in the RAM 44. In the case where determination is made for the angles between the newly calculated perpendicular bisector and one (specified one) of the already stored perpendicular bisectors, the newly calculated perpendicular bisector can be stored quickly, because the amount of necessary calculation is smaller as compared with the case where all the angles between the newly calculated perpendicular bisector and all the perpendicular bisectors already stored are obtained. In the case where determination is made for the angles between the newly calculated perpendicular bisector and all the stored perpendicular bisectors, a population for statistical processing is not formed by a plurality of perpendicular bisectors biased in a certain direction (i.e., by a plurality of perpendicular bisectors including a great number of perpendicular bisectors that are nearly parallel to each other among the all of the stored perpendicular bisectors). Therefore, the error of (in) the offset can be reduced.

In step S204, when the condition of step S202 is satisfied, the newly calculated perpendicular bisector is stored in the RAM 44.

In step S206, the stored plane number is incremented by one.

In step S112, the CPU 40 determines whether or not the stored plane number has reached a predetermined number (N). Notably, elapse of a predetermined time after generation of an offset update request may be used as the determination condition in Step 112, instead.

In step S114, a region in which a plurality of perpendicular bisectors stored in the RAM 44 meet (or a region through which a plurality of perpendicular bisectors stored in the RAM 44 pass) is approximated by a single point by use of a least-squares method, and the coordinate components of the approximate point are set and stored as an offset. Specifically, when the equations for N perpendicular bisectors stored in the RAM 44 are represented by $a_ix+b_iy+c_iz+d_i=0$ (where i is 1 to N) and the coordinate components of the approximate point are represented by (X, Y, Z), the region in which N of perpendicular bisectors meet can be approximated by a single point whose coordinate components are (X, Y, Z). The coordinate components X, Y, Z are determined by obtaining X, Y, Z at which each of values of the partial derivative of Equations (6) becomes zero. The partial derivative of Equations (6) are obtained by partially differentiating the following Equation (5) with respect to variables X, Y, and Z, respectively.

$$\varepsilon = \sum_{i=1}^{N}(a_iX + b_iY + c_iZ + d_i)^2 \quad (5)$$

$$\frac{\partial\varepsilon}{\partial X} = 2\sum_{i=1}^{N}(a_iX + b_iY + c_iZ + d_i)a_i = 0 \quad (6)$$

$$\frac{\partial\varepsilon}{\partial Y} = 2\sum_{i=1}^{N}(a_iX + b_iY + c_iZ + d_i)b_i = 0$$

$$\frac{\partial\varepsilon}{\partial Z} = 2\sum_{i=1}^{N}(a_iX + b_iY + c_iZ + d_i)c_i = 0$$

The three Equations (6) can be re-written as the following Equation (7).

$$\begin{bmatrix} [aa] & [ab] & [ac] \\ [ab] & [bb] & [bc] \\ [ac] & [bc] & [cc] \end{bmatrix} \begin{bmatrix} X \\ Y \\ Z \end{bmatrix} = \begin{bmatrix} -[ad] \\ -[bd] \\ -[cd] \end{bmatrix} \quad (7)$$

Accordingly, X, Y, and Z can be obtained by solving these simultaneous linear equations with three unknowns. In Equation (7), $$[aa] = \sum_{i=1}^{N} a_i a_i \quad (8)$$

$$[ab] = \sum_{i=1}^{N} a_i b_i$$

$$[ac] = \sum_{i=1}^{N} a_i c_i$$

$$[bb] = \sum_{i=1}^{N} b_i b_i$$

$$[bc] = \sum_{i=1}^{N} b_i c_i$$

$$[cc] = \sum_{i=1}^{N} c_i c_i$$

$$[ad] = \sum_{i=1}^{N} a_i d_i$$

$$[bd] = \sum_{i=1}^{N} b_i d_i$$

$$[cd] = \sum_{i=1}^{N} c_i d_i.$$

When the error $\epsilon$ which is obtained through substitution of the obtained O'(X, Y, Z) for Equation (5) is equal to or greater than a predetermined value, it means that the region in which the N perpendicular bisectors stored in the RAM 44 meet does not concentrate in a narrow range. In this case, the CPU 40 may be programmed to cancel the operation of setting the offset on the basis of the obtained point O'(X, Y, Z) and return to step S100.

3. Second Offset Setting Method

The second offset setting method to which the present invention is applied differs from the first offset setting method in the perpendicular bisector management processing.

Figure 7:
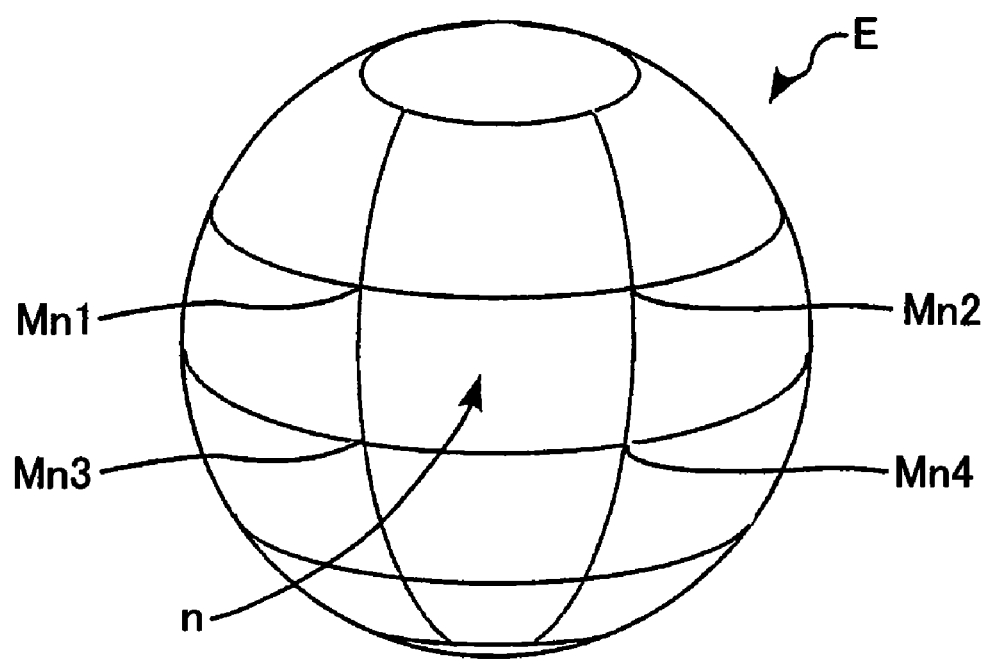
FIGS. 7 and 8 are schematic diagrams relating to the embodiment of the present invention.
Figure 8:
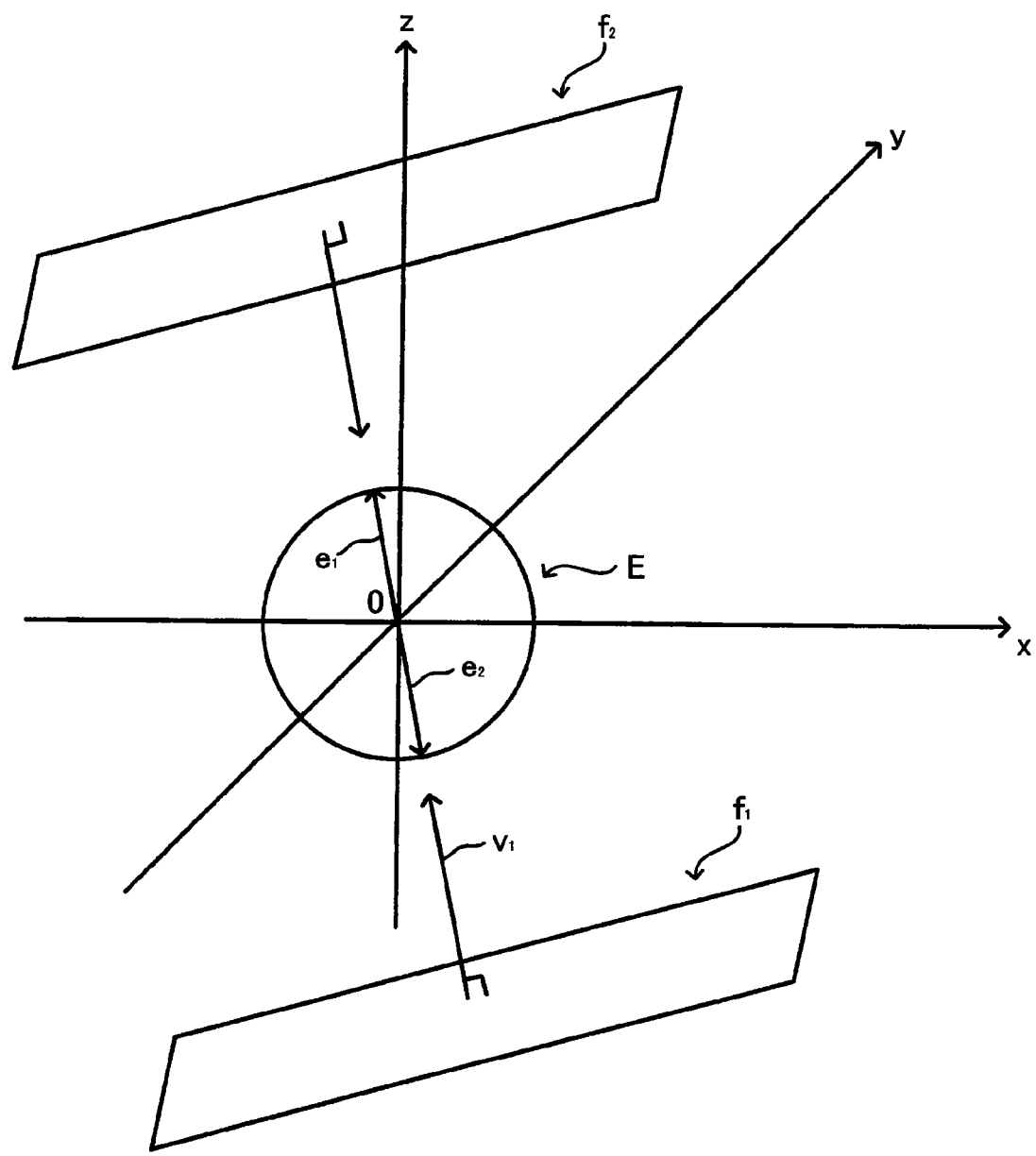

FIGS. 7 and 8 are schematic diagrams used for describing the perpendicular bisector management processing according to the second offset setting method. According to an offset setting program, a spherical surface of a unit sphere E having a radius of 1 is divided into a plurality of area sections which are substantially equal in area to one another as shown in FIG. 7, and perpendicular bisectors which form a population for statistical processing are accumulated for each area section. More specifically, for instance, a spherical surface of a unit sphere E centered at the origin is divided into a plurality of portions by planes parallel to the x-y plane, and the portions (excluding the areas intersecting the z axis) are further divided by radial planes parallel to the z axis into area sections, such that the area sections are of equal area (such that the sections has the equal area to one another). Each of the thus obtained area sections is the section mentioned above for which perpendicular bisectors which forms the population for statistical processing are accumulated. The offset setting program holds data defining the range of each such area section. The data defining the range of area section n are represented by x, y, and z components of end points $M_{n1}$, $M_{n2}$, $M_{n3}$, and $M_{n4}$ of the area section.

Figure 9:
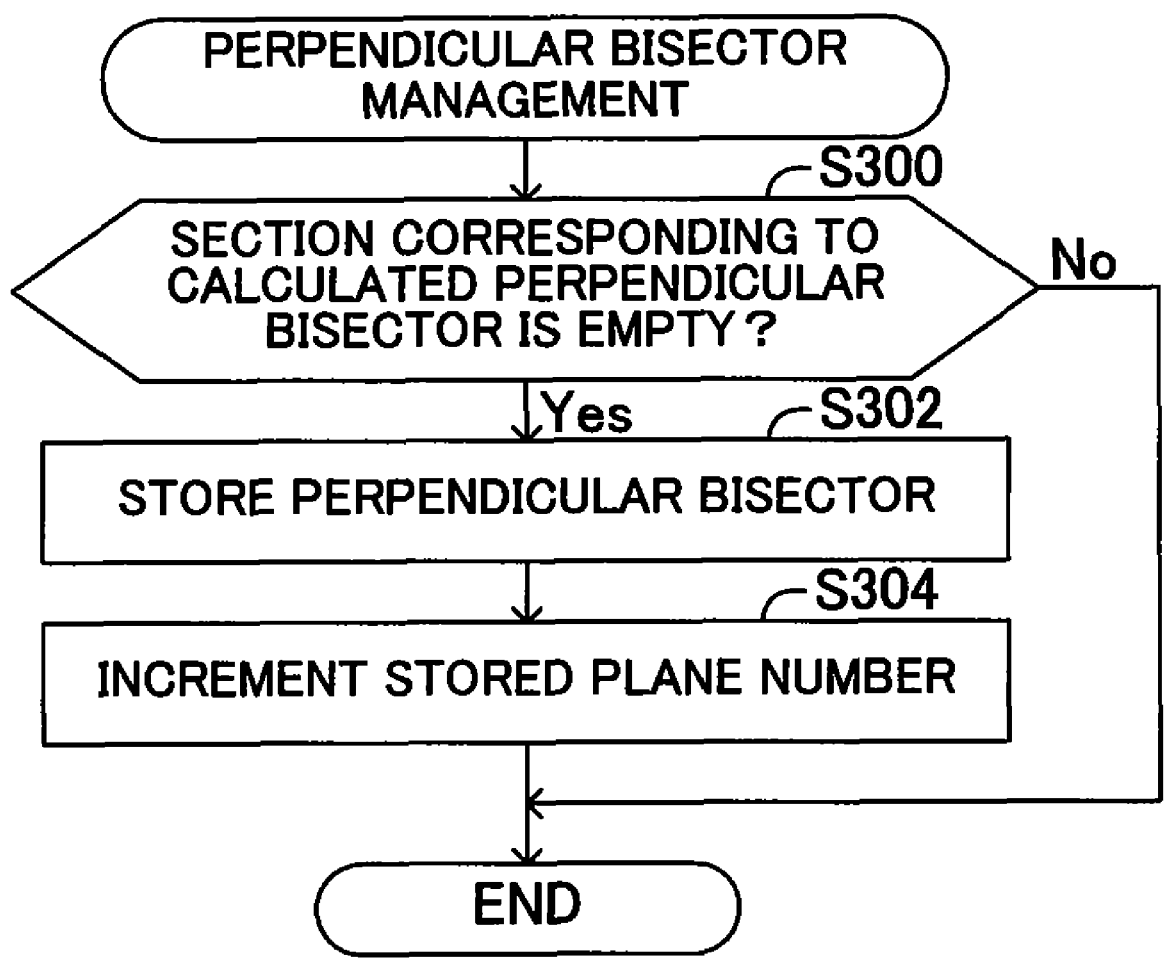
FIG. 9 is a flowchart according to the embodiment of the present invention.

FIG. 9 is a flowchart showing the flow of the perpendicular bisector management processing according to the second offset setting method. The processing shown in FIG. 9 is proceeded when the offset setting program is executed by the control section 45.

In step S300, the CPU 40 determines whether any perpendicular bisector is stored with being related to an area section which includes the end point of a unit vector perpendicular to a newly calculated perpendicular bisector and whose start point coincides with the center of the unit sphere. Specifically, as shown in FIG. 8, when a perpendicular bisector $f_1$ newly calculated from two points on the spherical surface of an unillustrated azimuth sphere is represented by ax+by+cz+d=0, the components of a perpendicular vector $v_1$ of the perpendicular bisector $f_1$ are represented by (a, b, c). The perpendicular vector $v_1$ (a, b, c) is normalized to have a unit length, whereby the end point of a unit vector $e_1$ can be calculated. For instance, when the end point (a', b', c') of the unit vector $e_1$ is contained in (or is within) an area section n of the unit sphere E, $M_{n3}z<c'\leq M_{n1}z$ and $M_{n1}y/M_{n1}x<b'/a'\leq M_{n2}y/M_{n2}x$ are satisfied. The CPU 40 determines whether any perpendicular bisector is stored with being related to the area section n which satisfies these relations. It should be noted that a single plane has two perpendicular vectors of opposite directions. In order to prevent redundantly storing perpendicular bisectors $f_1$ and $f_2$ both of which have substantially the same inclination, which storage is performed because the end point of the unit vector for the perpendicular bisector $f_2$ is contained in an area section in which the end point of the unit vector for the perpendicular bisector $f_1$ is not contained, the area sections within a half of the unit sphere E may be used. Specifically, for example, a hemispherical portion of the unit sphere E in which the z component is positive is used. In this case, when the z component of the unit vector $e_2$ which is normalized from the perpendicular vector $v_2$ to have a unit length is negative, the unit vector $e_2$ is transformed in a point-symmetrical manner while the origin is taken as the center, and a determination is made as to whether any perpendicular bisectors are already stored with being related to the area section which contains the end point of the resultant (or thus transformed) unit vector.

In step S302, when no perpendicular bisector has been stored with being related to the corresponding area section, the newly calculated perpendicular bisector is stored while being related to that area section.

In step S304, the stored plane number is incremented by one.

In the present embodiment, only a single perpendicular bisector can be stored with being related to each area section. However, a plurality of perpendicular bisectors may be stored (preferably, up to a predetermined number) with being related to each area section. When a Yes determination is made in step S112, perpendicular bisectors have been stored for the area sections evenly. The center of the azimuth sphere is statistically calculated by use of these perpendicular bisectors, whereby the error of (in) the obtained offset with respect to the true offset can be reduced, because of the following reason explained by taking an example in which two perpendicular bisectors are considered. Even when the distance between each of the perpendicular bisectors and the point corresponding to the true offset is small, the distance between the common line of the two perpendicular bisectors and the point corresponding to the true offset becomes large, if the two perpendicular bisectors are nearly parallel to each other. Therefore, if such perpendicular bisectors are contained in the population for statistical calculation, the error of the offset becomes large. Moreover, in the present embodiment, it is unnecessary to obtain all the angles between the newly calculated perpendicular bisector and all the already calculated (or stored) perpendicular bisectors in order to store perpendicular bisectors whose inclinations are not biased. Therefore, the amount of necessary calculation is small, and newly calculated perpendicular bisector can be stored quickly.

What is claimed is:

1. A magnetic-sensor controller comprising:
    input section which successively inputs a plurality of magnetic data sets, each including three components, successively output from a three-dimensional magnetic sensor and;
    perpendicular-bisector calculation section which calculates, for each pair of two of the magnetic data sets, a perpendicular bisector of two points corresponding to the two magnetic data sets;
    memory which stores a plurality of the perpendicular bisectors; and
    setting section which statistically approximates, by a single point, a region where the plurality of perpendicular bisectors stored in the memory meet and sets an offset of the magnetic data set on the basis of the single point.

2. The magnetic-sensor controller according to claim 1, wherein the setting section calculates the single point by a least-squares method using the plurality of perpendicular bisectors stored in the memory.

3. The magnetic-sensor controller according to claim 1, further comprising selector which selects suitable pairs each of which is obtained by combining, in the order of input, two magnetic data sets if the two magnetic data sets corresponds to respective two points spaced from each other by at least a predetermined distance, wherein the perpendicular bisector calculation section calculates the perpendicular bisectors from the selected pairs.

4. The magnetic-sensor controller according to claim 1, further comprising management section which manages the memory so as to store a newly calculated perpendicular bisector into the memory when all the angles between the newly calculated perpendicular bisector and one of the perpendicular bisectors already stored in the memory are greater than or equal to a predetermined angle.

5. The magnetic-sensor controller according to claim 1, further comprising management section which manages the memory so as to store a newly calculated perpendicular bisector into the memory when all the angles between the newly calculated perpendicular bisector and all the perpendicular bisectors already stored in the memory are greater than or equal to a predetermined angle.

6. The magnetic-sensor controller according to claim 1, further comprising management section which manages the memory so as to store in the memory the perpendicular bisectors in a predetermined number or less for each of area sections defined on the spherical surface of a unit sphere centered at a specific point and being substantially equal in area to each other, wherein the end point of a unit vector which is perpendicular to each perpendicular bisector stored in the memory and whose start point coincides with the specific point is contained in the corresponding area section.

7. A magnetism measurement apparatus comprising:
    a magnetic-sensor controller according to claim 1; and
    the three-dimensional magnetic sensor.

8. An offset setting method comprising the steps of:
    successively inputting a plurality of magnetic data sets, each including three components, successively output from a three-dimensional magnetic sensor;
    calculating, for each pair of two of the magnetic data sets, a perpendicular bisector of two points corresponding to the two magnetic data sets;
    storing a plurality of the perpendicular bisectors; and
    statistically approximating, by a single point, a region where the plurality of stored perpendicular bisectors meet, and setting an offset of the magnetic data sets on the basis of the single point.

9. A non-transitory computer-readable recording medium on which an offset setting program is recorded, said program causes a computer to function as:
    successively inputting a plurality of magnetic data sets, each including three components, successively output from a three-dimensional magnetic sensor,
    calculating, for each pair of two of the magnetic data sets, a perpendicular bisector of two points corresponding to the two magnetic data sets;
    storing a plurality of the perpendicular bisectors; and
    statistically approximating, by a single point, a region where the plurality of stored perpendicular bisector meet, and setting an offset of the magnetic data sets on the basis of the single point.

* * * * *